(12) United States Patent
Eberle

(10) Patent No.: US 11,655,656 B2
(45) Date of Patent: May 23, 2023

(54) LOCKING DEVICE FOR LOCKING A CHARGING FLAP OF AN ELECTRICALLY OPERATED MOTOR VEHICLE AND ELECTRICALLY OPERATED MOTOR VEHICLE COMPRISING SUCH A LOCKING DEVICE

(71) Applicant: Dr. Ing. h.c. F. Porsche Aktiengesellschaft, Stuttgart (DE)

(72) Inventor: Wilfried Eberle, Ehingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 208 days.

(21) Appl. No.: 17/026,404

(22) Filed: Sep. 21, 2020

(65) Prior Publication Data

US 2021/0095501 A1 Apr. 1, 2021

(30) Foreign Application Priority Data

Oct. 1, 2019 (DE) ..................... 10 2019 126 481.2

(51) Int. Cl.
*E05B 83/34* (2014.01)
(52) U.S. Cl.
CPC .................................. *E05B 83/34* (2013.01)
(58) Field of Classification Search
CPC . E05B 83/34; E05B 85/00; B60K 2015/0576; B60K 2015/0584; B60K 15/05; Y02T 10/70; Y02T 10/7072; Y02T 90/14
See application file for complete search history.

(56) References Cited

U.S. PATENT DOCUMENTS

| 9,969,279 | B2 * | 5/2018 | Southey | B60K 15/05 |
| 2013/0047687 | A1 * | 2/2013 | Kurumizawa | B60L 53/16 70/490 |
| 2014/0300319 | A1 * | 10/2014 | Nakajima | B60L 53/16 320/109 |
| 2016/0348408 | A1 | 12/2016 | Watanabe | |
| 2018/0145442 | A1 * | 5/2018 | Sanchez Patino | B29C 45/04 |

FOREIGN PATENT DOCUMENTS

| CN | 104775671 A | 7/2015 |
| CN | 105899745 A | 8/2016 |

OTHER PUBLICATIONS

Chinese Office Action for Chinese Application No. 202010925525. 1, dated Jul. 20, 2021 with translation, 12 pages.

\* cited by examiner

*Primary Examiner* — Kristina R Fulton
*Assistant Examiner* — Thomas L Neubauer
(74) *Attorney, Agent, or Firm* — RatnerPrestia

(57) ABSTRACT

A locking device for locking a charging flap of an electrically operated motor vehicle, with a latching device, a latch catch device and a receiving device. The receiving device includes a receptacle in which the latch catch device is accommodated in a form-fitting manner and is fixedly clamped. The latching device is connectable to a body component of the motor vehicle and the receiving device is connectable to the charging flap of the motor vehicle. The latching device is connectable in a locking position in a form-fitting manner to the latch catch device and in a release position is separable from the latch catch device. The latch catch device is designed in order, in the locking position of the latching device, to be removable without destruction from the receptacle by exertion of a predetermined minimum pull-off force by the latching device along a pull-off direction.

11 Claims, 5 Drawing Sheets

Figure 1:
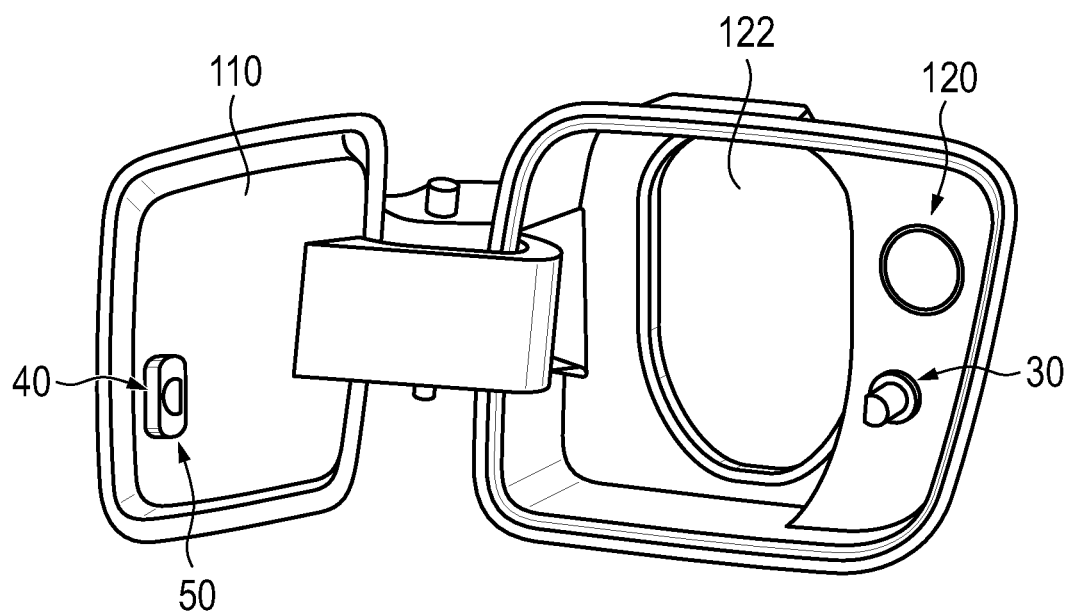

LOCKING DEVICE FOR LOCKING A CHARGING FLAP OF AN ELECTRICALLY OPERATED MOTOR VEHICLE AND ELECTRICALLY OPERATED MOTOR VEHICLE COMPRISING SUCH A LOCKING DEVICE

CROSS-REFERENCE TO RELATED APPLICATION

This application claims priority to German Patent Application No. 10 2019 126 481.2, filed Oct. 1, 2019, the content of such application being incorporated by reference herein in its entirety.

FIELD OF THE INVENTION

The invention relates to a locking device for locking a charging flap of an electrically operated motor vehicle and to an electrically operated motor vehicle comprising such a locking device.

BACKGROUND OF THE INVENTION

Locking devices of the type mentioned at the beginning which via an emergency release cord which is accessible to a motor vehicle driver behind a trunk covering of the motor vehicle for emergency release of the locking device, are known from the prior art. The locking devices known from the prior art can be used either for charging flaps of electrically operated motor vehicles or for tank flaps of fuel-operated motor vehicles. Said locking devices can also be used for closing tank flaps and/or charging flaps of what are referred to as hybrid vehicles. However, said locking devices with an emergency release function are relatively costly and time-consuming to produce.

SUMMARY OF THE INVENTION

Described herein is a locking device which can be produced cost-effectively and permits simple opening of the charging flap in the event of an emergency.

The locking device according to aspects of the invention is provided with a latching device, a latch catch device and a receiving device. The receiving device comprises a receptacle in which the latch catch device is accommodated in a form-fitting manner and is fixedly clamped. The latching device is connectable to a body component of the motor vehicle and the receiving device is connectable to the charging flap of the motor vehicle. The latching device is connectable in a locking position in a form-fitting manner to the latch catch device and in a release position is separable from the latch catch device. The latch catch device is designed in order, in the locking position of the latching device, to be removable without destruction from the receptacle by means of exertion of a predetermined minimum pull-off force by the latching device along a pull-off direction.

In a preferred refinement, the receptacle has a cylindrical first receiving portion and a funnel-shaped second receiving portion which opens into the first receiving portion, and the latch catch device comprises a cylindrical base portion and a funnel-shaped holding portion, wherein the holding portion is received in a form-fitting manner in the second receiving portion and the base portion is received in a form-fitting manner in the first receiving portion, and wherein the holding portion is larger in a radial direction than the first receiving portion.

The holding portion is preferably elastically compressible in the radial direction.

In a preferred refinement, the second receiving portion in cross section forms an angle of approx. 135° with the first receiving portion.

The holding portion is preferably provided with a multiplicity of slots.

In a preferred refinement, the holding portion is manufactured in portions from a soft elastic plastic and in portions from a hard plastic.

The latch catch device preferably comprises a depression and the receiving device comprises a bridge portion which is received in the depression in such a manner that the latch catch device is held in a form-fitting manner in the receptacle to prevent a relative rotation of the latch catch device and the receiving device, and is fixedly clamped in the receptacle.

In a preferred refinement, the locking device comprises an emergency opening tool with a hook for hooking behind the charging flap.

The invention furthermore relates to an electrically operated motor vehicle comprising a body component, a charging flap and a locking device according to aspects of the invention for locking the charging flap, wherein the latching device of the locking device is connected to the body component and the receiving device of the locking device is connected to the charging flap.

The invention furthermore relates to an electrically operated motor vehicle comprising a locking device according to aspects of the invention.

BRIEF DESCRIPTION OF THE DRAWING FIGURES

Figure 2:
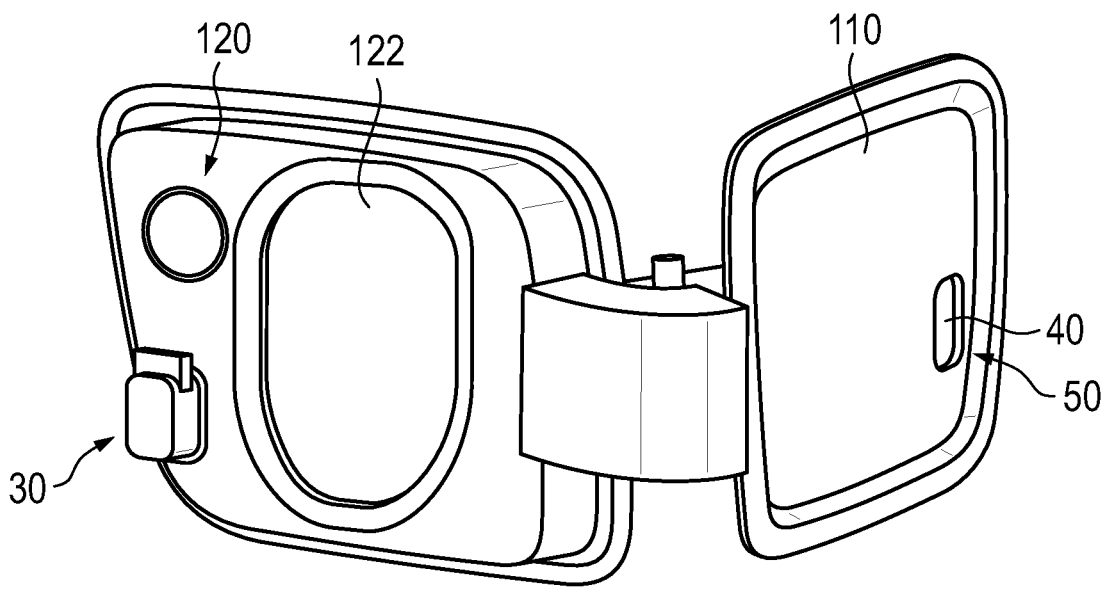
Figure 3:
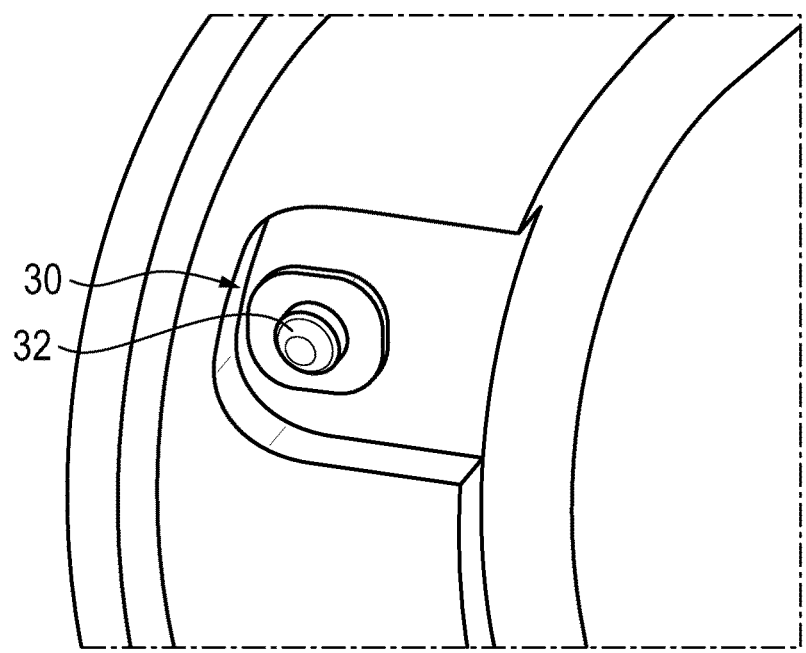
Figure 4:
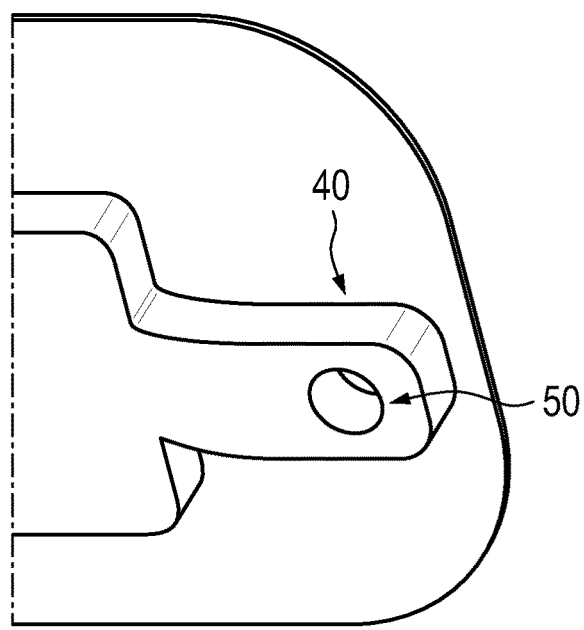
Figure 5:
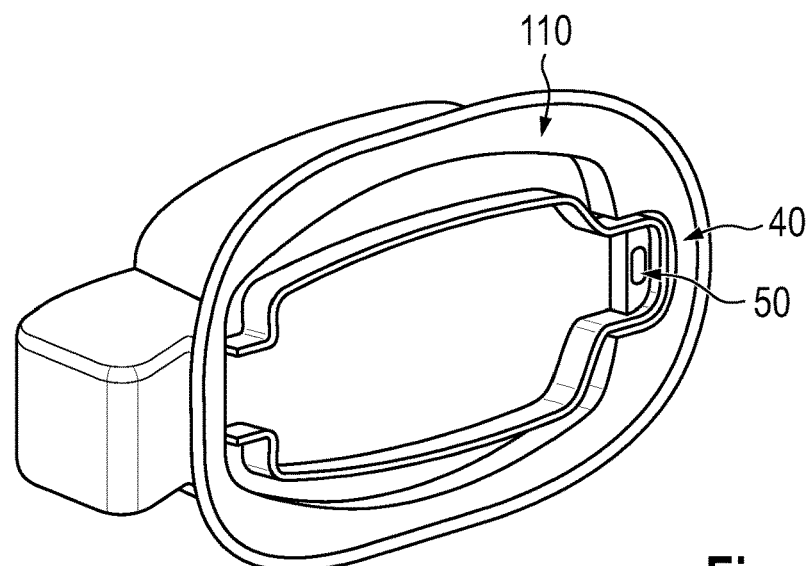
Figure 6:
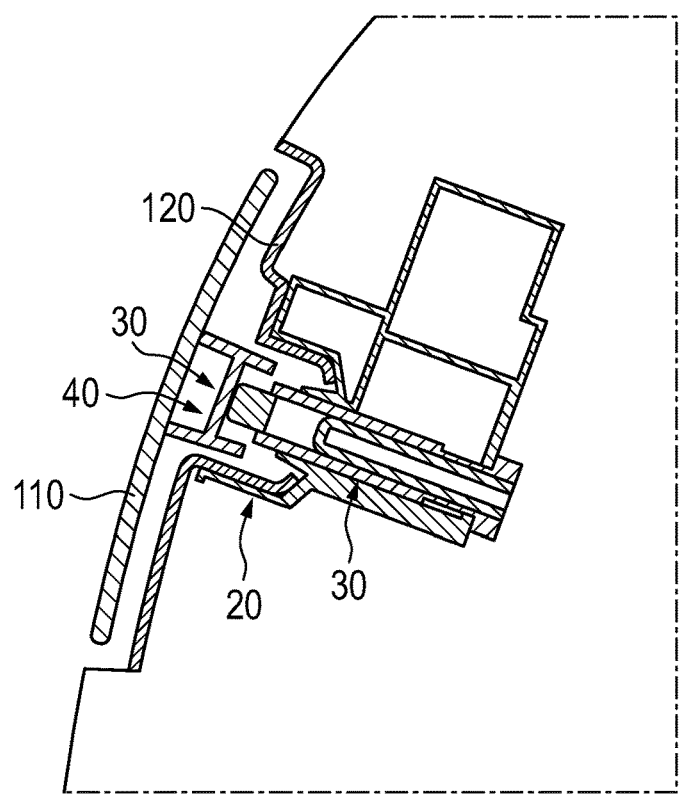
Figure 7:
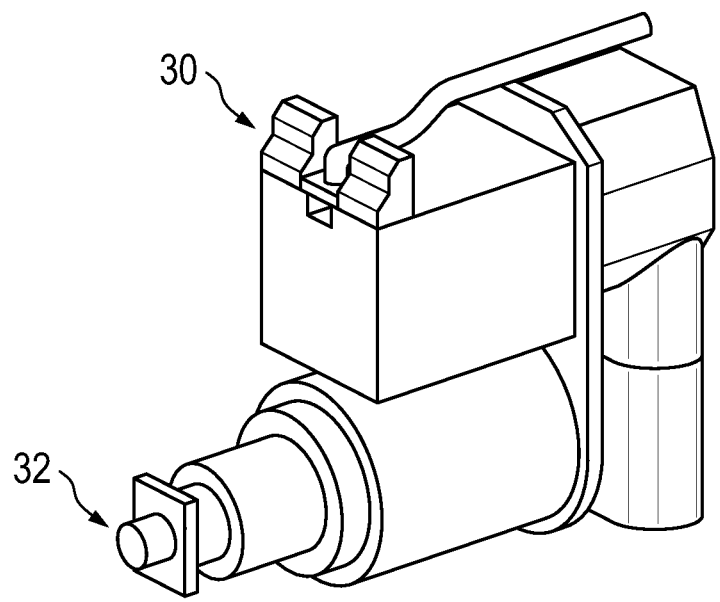
Figure 8:
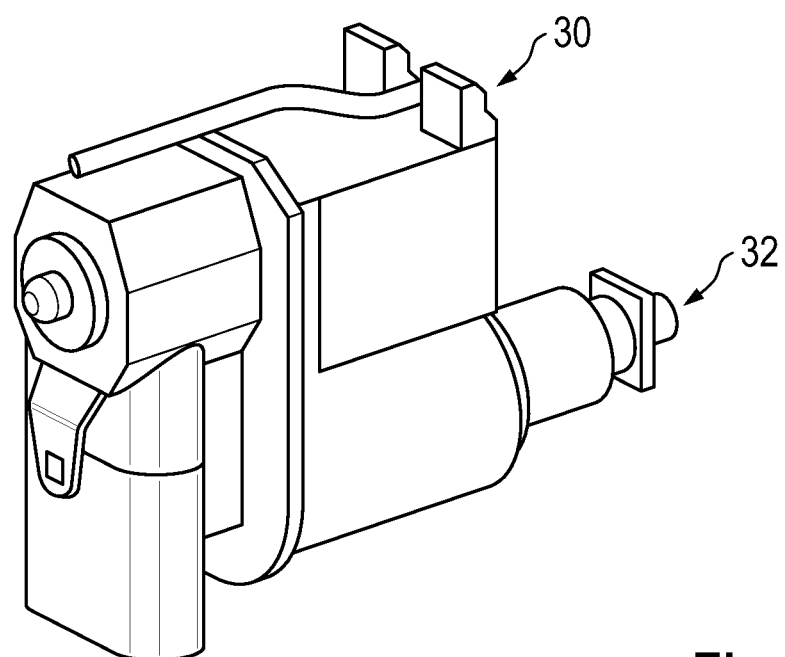
Figure 9:
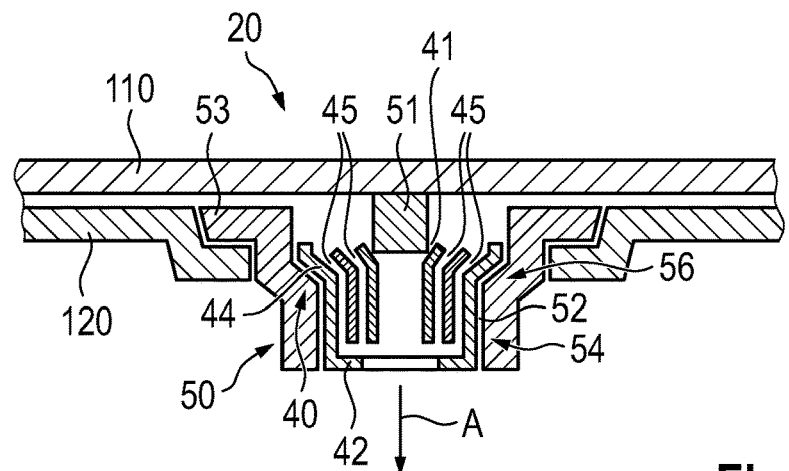
Figure 10:
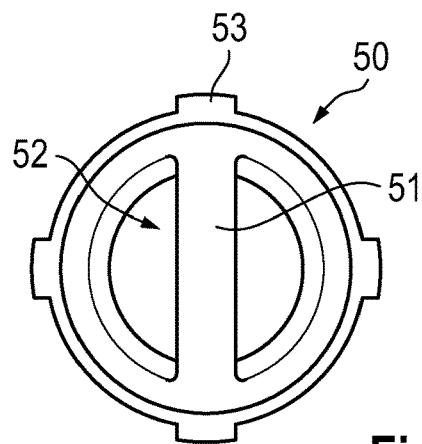
Figure 11:
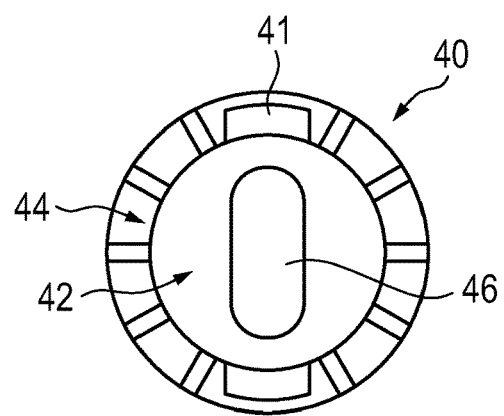

Details and further advantages of the locking device according to aspects of the invention and of the motor vehicle according to aspects of the invention will be explained with reference to an exemplary embodiment described below. Here:

FIGS. 1 and 2: each show a perspective view of a charging flap of an electrically operated motor vehicle with a locking device according to an exemplary embodiment;

FIGS. 3 and 4: each show a perspective view of a further charging flap with a locking device according to the exemplary embodiment;

FIG. 5: shows a perspective view of a further charging flap with a locking device according to the exemplary embodiment;

FIG. 6: shows a sectional view of the charging flap from FIG. 5;

FIGS. 7 and 8: each show perspective views of a latching device of the locking device according to the exemplary embodiment;

FIG. 9: shows a sectional view of a receiving device and of a latch catch device of the locking device according to the exemplary embodiment;

FIG. 10: shows a top view of the receiving device of the locking device according to the exemplary embodiment; and FIG. 11: shows a top view of the latch catch device of the locking device according to the exemplary embodiment.

DETAILED DESCRIPTION OF THE INVENTION

Referring to FIGS. 1-11, the application relates to a locking device 20 for locking a charging flap 110 of an electrically operated motor vehicle. The locking device 20 comprises a latching device 30, a latch catch device 40 and a receiving device 50, wherein the receiving device 50 comprises a receptacle 52 in which the latch catch device 40 is received in a form-fitting manner and is fixedly clamped.

The latching device 30 is connectable to a body component 120 of the motor vehicle and the receiving device 50 is connectable to the charging flap 110 of the motor vehicle. The latching device 30 is connectable in a locking position VS in a form-fitting manner to the latch catch device 40 and in a release position ES is separable from the latch catch device 40. The latch catch device 40 is designed in order, in the locking position VS of the latching device 30, to be removable without destruction from the receptacle 52 by means of exertion of a predetermined minimum pull-off force by the latching device 30 along a pull-off direction A.

The minimum pull-off force here can be, for example, approx. 150 N.

A charging module, not illustrated pictorially, of the electrically driven motor vehicle can be installed from the outside into an opening 122 of the body component 120 and can be protected by means of the charging flap 110 against unauthorized access. The charging flap 110 can be pivoted forward with respect to the direction of travel of the motor vehicle in order to open up the charging module for access.

As in particular FIG. 10 reveals, the receiving device 50 can comprise a collar portion 53 which is in the form of a bayonet closure. The collar portion 53 serves for fastening the receiving device 50 to the charging flap 110 of the motor vehicle. The latching device 30 can be fastened to the body component 120 likewise by means of a bayonet closure.

The latch catch device 40 can comprise a latching opening 46 which can in particular be in the form of an elongated hole, as, for example, FIG. 11 reveals.

For the transfer of the latching device 30 from the locking position VS into the release position ES, a latching element 32 can be rotated through 90°. In the release position ES, the latching element 32 can be removed from the latching opening 46. In the locking position VS, the latching element 32 analyzes the latching opening 46.

The receptacle 52 can have a cylindrical first receiving portion 54 and a funnel-shaped second receiving portion 56 which opens into the first receiving portion 54. The latch catch device 40 can comprise a cylindrical base portion 42 and a funnel-shaped holding portion 44, wherein the holding portion 44 is received in a form-fitting manner in the second receiving portion 56 and the base portion 42 is received in a form-fitting manner in the first receiving portion 54, and wherein the holding portion 44 is larger in a radial direction R than the first receiving portion 54.

The holding portion 44 can be elastically compressible, in particular can be compressible in the radial direction R.

In order to remove the latching device 40 from the receptacle 52, first of all a pull-off force is exerted by means of the latching device 30 on the latching device 40 in the pull-off direction A. The exertion of the pull-off force causes the funnel-shaped holding portion 44 to move in the direction of the first receiving portion 54. Here, the funnel shape of the holding portion 44 brings about compression of the holding portion 44 in the radial direction R. If a sufficiently high pull-off force is exerted, the holding portion 44 is compressed in such a manner that it can pass through the first receiving portion 54 of the receptacle 52.

The second receiving portion 56 in cross section can form an angle α of approx. 135° with the first receiving portion 54.

The holding portion 44 can be provided with a multiplicity of slots 45. Here, the slots 45 can preferably be oriented parallel to one another.

The holding portion 44 can be manufactured in portions from a soft elastic plastic and in portions from a hard plastic.

The latch catch device 40 can comprise a depression 41 and the receiving device 50 can comprise a bridge portion 51 which is received in the depression 41 in such a manner that the latch catch device 40 is held in a form-fitting manner in the receptacle 52 to prevent a relative rotation of the latch catch device 40 and the receiving device 50, and is fixedly clamped in the receptacle 52.

A microswitch, not illustrated pictorially, can be arranged on the bridge portion 51 and is actuated by the latch catch device 40 when the latch catch device 40 is received in the receptacle 52. This configuration makes it possible for the microswitch to identify an emergency opening of the charging flap 110 by the removal of the latch catch device 40 from the receptacle 52 being detected. Behind the bridge portion 51, the receiving device 50 can furthermore be formed free from an undercut.

The locking device 20 can furthermore comprise an emergency opening tool which is provided with a hook for hooking behind the charging flap 110. By means of the emergency opening tool, the charging flap 110 can be opened in the event of an emergency by indirect exertion of a sufficient pull-off force. The emergency opening tool here forms a lever for lifting the charging flap 110. A gap formed between the charging flap 110 and the body component 120 has a width here of approx. 2.5 mm.

The application furthermore relates to an electrically operated motor vehicle comprising a body component 120, a charging flap 110 and a locking device 20 according to the application for locking the charging flap 110, wherein the latching device 30 of the locking device 20 is connected to the body component 120 and the receiving device 50 of the locking device 20 is connected to the charging flap 110.

What is claimed:

1. A locking device for locking a charging flap of an electrically operated motor vehicle, said locking device comprising:
   a latching device that is connected to a body component of the motor vehicle and movable between a locking position and a release position, wherein, in the locking position, the charging flap is prevented from moving from a closed position to an open position without exceeding a predetermined minimum pull-off force, and, in the release position, the charging flap may be freely moved from the closed position to the open position,
   an elastically-compressible latch catch device, which is connected to the latching device in the locking position of the latching device, and is separable from the latching device in the release position of the latching device, and
   a receiving device connected to the charging flap, the receiving device comprising a receptacle in which the latch catch device is accommodated in a form-fitting manner, wherein, in both the locking position and the release position of the latching device, the latch catch device overlaps the receptacle in a radial direction to prevent inadvertent removal of the latch catch device from the receiving device, and
   wherein the latch catch device is configured, in the locking position of the latching device, to be removable without destruction from the receptacle by pulling the receptacle over the latch catch device in a pull-off direction using a pull-off force that is greater than a predetermined minimum pull-off force, which causes the latch catch device to elastically compress in the radial direction against the receptacle so that the receptacle passes over the radially compressed latch catch device.

2. The locking device as claimed in claim 1, wherein the receptacle has a cylindrical first receiving portion and a funnel-shaped second receiving portion which opens into the first receiving portion, and the latch catch device comprises a cylindrical base portion and a funnel-shaped holding portion, wherein the holding portion is received in a form-fitting manner in the second receiving portion and the base portion is received in a form-fitting manner in the first receiving portion, and wherein the holding portion is larger in a radial direction than the first receiving portion.

3. The locking device as claimed in claim 2, wherein the second receiving portion in cross section forms an angle (a) of about 135° with the first receiving portion.

4. The locking device as claimed in claim 2, wherein the holding portion is provided with a multiplicity of slots.

5. The locking device as claimed in claim 2, wherein the holding portion comprises an elastic plastic and a hard plastic having a greater hardness than the elastic plastic.

6. The locking device as claimed in claim 1, wherein the latch catch device comprises a depression and the receiving device comprises a bridge portion which is received in the depression in such a manner that the latch catch device is held in a form-fitting manner in the receptacle to prevent a relative rotation of the latch catch device and the receiving device, and is fixedly clamped in the receptacle.

7. The locking device as claimed in claim 1, further comprising an emergency opening tool with a hook for hooking behind the charging flap.

8. An electrically operated motor vehicle comprising the body component, the charging flap and the locking device as claimed in claim 1 for locking the charging flap, wherein the latching device of the locking device is connected to the body component and the receiving device of the locking device is connected to the charging flap.

9. An assembly comprising the locking device of claim 1 and the flap.

10. The locking device as claimed in claim 1, wherein, in the locking position of the latching device, the latch catch device is not removable from the receptacle by means of exertion of a pull-off force that is less than the predetermined minimum pull-off force along the pull-off direction.

11. The locking device as claimed in claim 1, wherein, in an unlocked position of the latching device, the latch catch device is not removable from the receptacle during exertion of a pull-off force along the pull-off direction.

\* \* \* \* \*